United States Patent
Venkatachalam et al.

(10) Patent No.: US 8,018,916 B2
(45) Date of Patent: Sep. 13, 2011

(54) TECHNIQUES TO COUPLE HARQ-ARQ IN WIRELESS NETWORKS

(75) Inventors: Muthaiah Venkatachalam, Beaverton, OR (US); Xiangying Yang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1208 days.

(21) Appl. No.: 11/690,230

(22) Filed: Mar. 23, 2007

(65) Prior Publication Data

US 2008/0101285 A1    May 1, 2008

Related U.S. Application Data

(60) Provisional application No. 60/854,541, filed on Oct. 25, 2006.

(51) Int. Cl.
*H04J 3/24* (2006.01)

(52) U.S. Cl. ........................ 370/349; 370/373
(58) Field of Classification Search .................. 370/310, 370/314, 332, 349
See application file for complete search history.

(56) References Cited

U.S. PATENT DOCUMENTS

2007/0086422 A1 * 4/2007 Kim et al. .................. 370/349
2008/0022178 A1 * 1/2008 Kim et al. .................. 714/748

* cited by examiner

*Primary Examiner* — Brenda H Pham
(74) *Attorney, Agent, or Firm* — Thorpe North & Western LLP (57) ABSTRACT

An embodiment of the present invention provides an apparatus, comprising a transceiver adapted to reduce ARQ overhead by coupling HARQ and ARQ feedback signaling and defining different HARQ burst regions that enable different regions to use different HARQ feedback configurations based on channel quality or QoS requirements.

20 Claims, 11 Drawing Sheets

TECHNIQUES TO COUPLE HARQ-ARQ IN WIRELESS NETWORKS

CROSS-REFERENCE TO RELATED APPLICATION

This application claims the benefit of Provisional Patent Application Ser. No. 60/854,541, filed 25 Oct. 2006, entitled "TECHNIQUES TO COUPLE HARQ-ARQ IN WIRELESS NETWORKS", by Venkatachalam et al.

BACKGROUND

The performance of typical Internet applications like TCP, VoIP etc. suffers from the unreliable wireless communications. It has been shown that one can achieve significant performance gain by improving the communication reliability at PHY and link layer.

Thus, a strong need exists for techniques to couple HARQ-ARQ in wireless networks to improve communication reliability at the PHY and link layer.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may be used in various other apparatuses, devices, systems and/or networks.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

The performance of typical Internet applications like TCP, VoIP etc. suffers from the unreliable wireless communications. It has been shown that one can achieve significant performance gain by improving the communication reliability at PHY and link layer. Hybrid Automatic Repeat reQuest (HARQ) is a physical layer (PHY) mechanism such as that shown as 100 of FIG. 1, which is directed to achieving fast recovery from wireless link errors. In case of packet error, HARQ performs soft-combing of retransmitted signals to correct the error, and thus significantly reduces the delay to recover the corrupted packet compared with simple retransmission, e.g. ARQ. HARQ takes the form of either Chasing Combining or Incremental Redundancy. For both, a later retransmission is combined with previous transmissions and the packet error probability decreases as more retransmissions are combined. For example, we consider chase combining in which HARQ always retransmit the same copy of the packet and the multiple copies are combined to improve the SINR. HARQ also enables fast feedback to further reduce the delay during error recovery. For each packet, HARQ employs a "stop-and-wait" procedure until the packet is successfully delivered or eventually discarded due to excessive number of failures.

Figure 1:
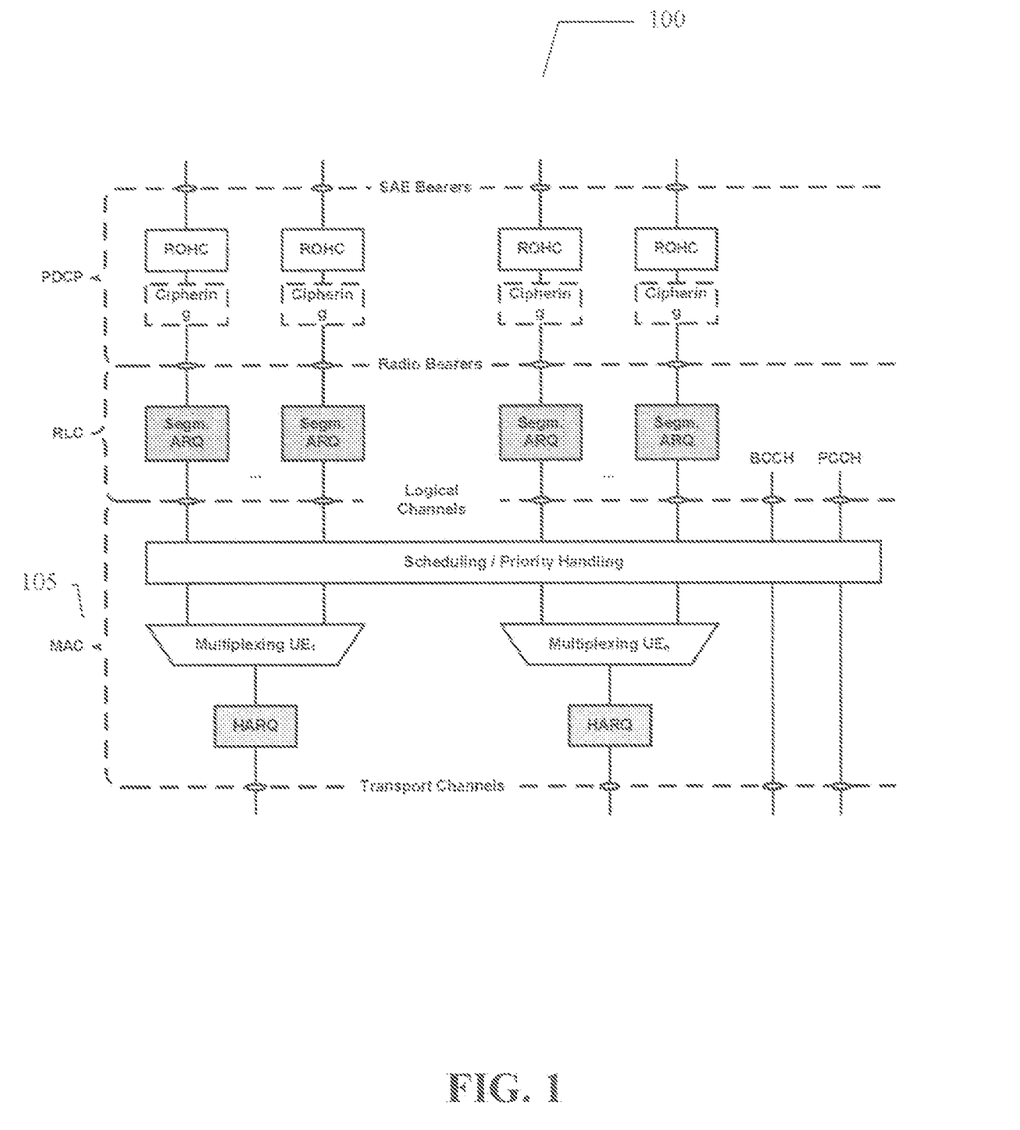
FIG. 1 is a 3GPP LTE PHY/MAC reference model (downlink) in an embodiment of the present invention.

The Automatic Repeat reQuest (ARQ) of FIG. 1 may reside in upper MAC layer 105. It is designed to ensure in-order packet delivery and further enhance link-layer reliability via its own retransmission mechanism. Different from HARQ, ARQ does not perform combining of retransmission packets. Also ARQ feedbacks may be sent as regular MAC packets, which are more reliable, carries more feedback information but incurs longer delay and larger overheads. Due to such difference, ARQ is typically used with best-effort traffic that is delay-tolerant.

In a system with both ARQ and HARQ enabled, there is clearly some redundancy in the overlapped HARQ and ARQ retransmissions. Consider a transmitter in FIG. 2, its ARQ 205 retransmission may be triggered because either its retransmission timer expires or it receives an ARQ NACK. It is possible, after receiving an ARQ NACK, ARQ 205 starts its own retransmission while HARQ 210 is still in the process of HARQ retransmission (of the first copy ARQ layer transmits). On the other hand, if ARQ 205 retransmission interval is too long just to avoid such overlapped HARQ/ARQ retransmissions, it will potentially lead to slower error correction and lower throughput.

Figure 2:
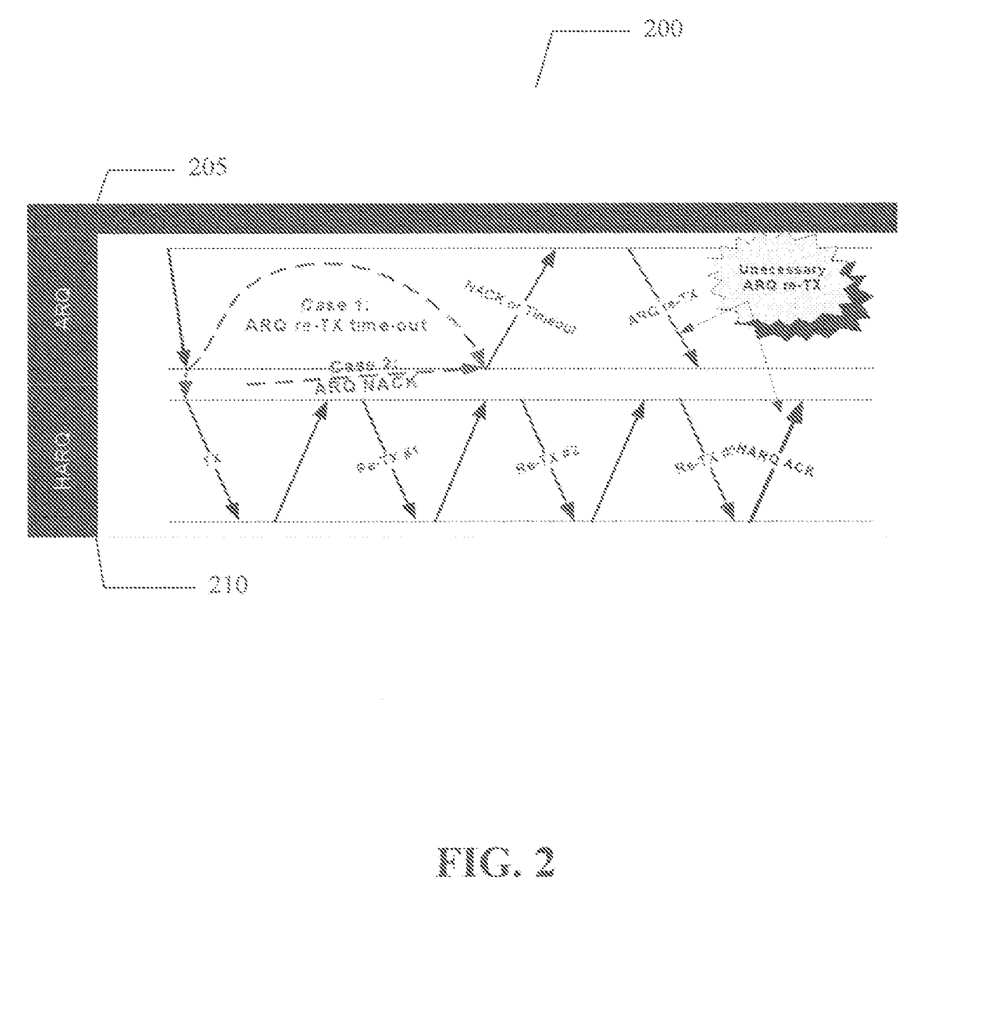
FIG. 2 depicts a redundant ARQ and HARQ retransmission at a transmitter in accordance with an embodiment of the invention.

An embodiment of the present invention provides reducing ARQ 205 overhead by coupling HARQ 210 and ARQ 205 feedback signaling. The previously discussed redundancy issue can be avoided by replacing actual ARQ 205 feedback transmissions with internal feedback signaling messages generated from HARQ 210 layer. Such coupling requires system design to maintain certain cross-layer resource mapping between HARQ 210 channel and ARQ 205.

An embodiment of the present invention provides enhanced HARQ feedback reliability and efficiency. By coupling HARQ and ARQ, ARQ offers extra reliability over HARQ. Since HARQ feedbacks are not CRC protected, such signaling errors and residual HARQ error could still be too high for applications (e.g. high data rate TCP transfers). In addition, current Worldwide Interoperability for Microwave Access (WiMAX)— it is understood that the present invention is not limited to WiMAX—uses the same modulation (½ slot=24 tones for 1 ACK/NACK) for all HARQ feedbacks, which is not efficient when MSS channels or QoS requirements are different. Thus, an embodiment of the present invention may define different HARQ burst regions and allow different regions use different HARQ feedback configurations based on channel quality or QoS requirements.

Finally an ARQ ACK polling may be used to address the scenario of single or last packet transmission, for which HARQ layer optimization may not apply.

Figure 3:
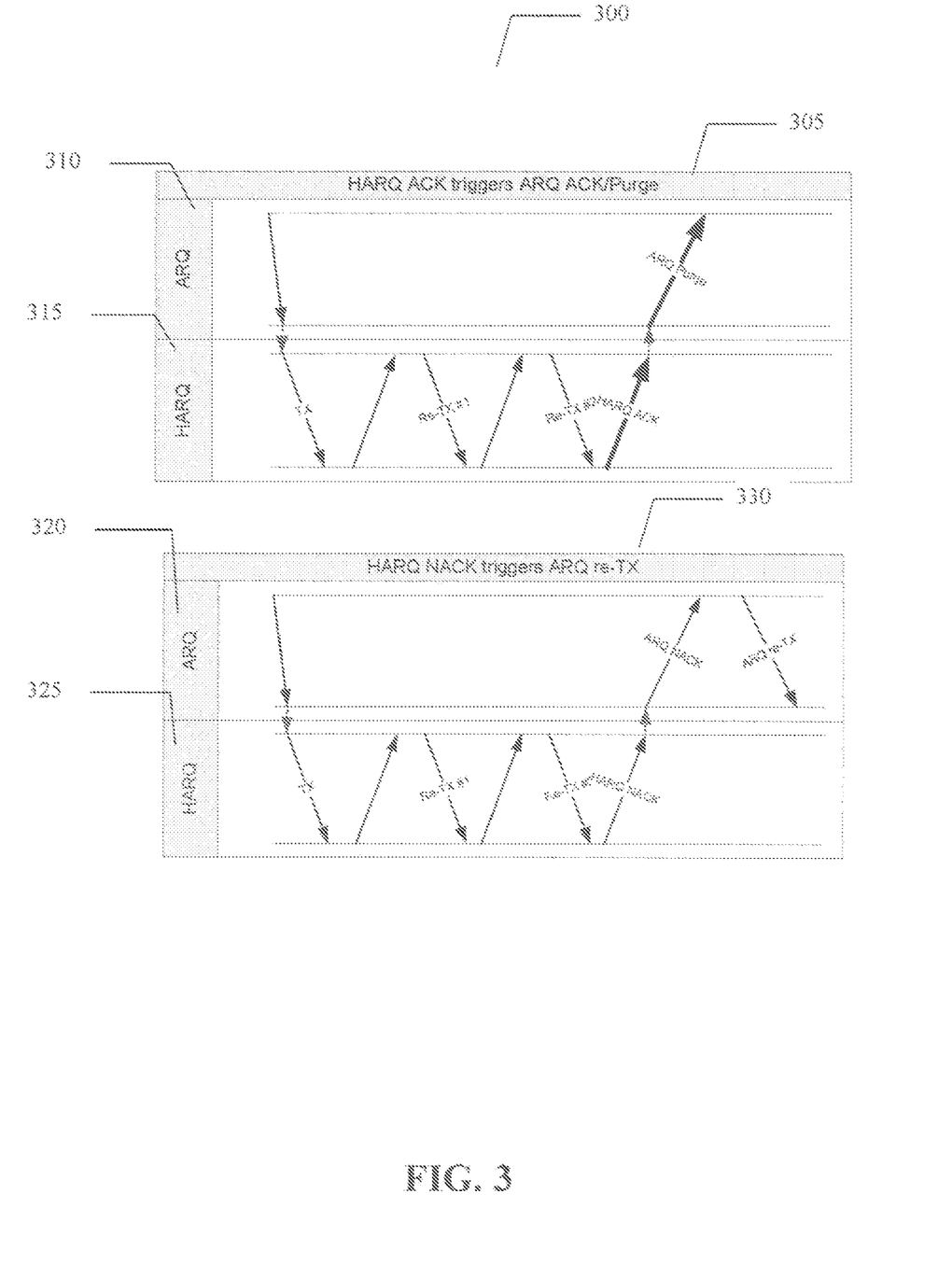
FIG. 3 depicts the coupling HARQ and ARQ ACK/NACK in accordance with an embodiment of the present invention.

Turning now to FIG. 3, shown generally as 300, the general framework of coupling HARQ (315 and 325) and ARQ (310 and 320) to reduce signaling overheads is illustrated. Consider ACK first. As shown at 305, ARQ layer will not transmit any ACK onto the air link. Instead, an internal ARQ ACK is triggered by HARQ layer when a packet is successfully delivered. An ARQ retransmission timer is optional in this context. Similarly for ARQ NACK, an internal ARQ NACK may be generated when HARQ layer gives up retransmission process. ARQ then initiates MAC layer retransmission process 330.

Figure 4:
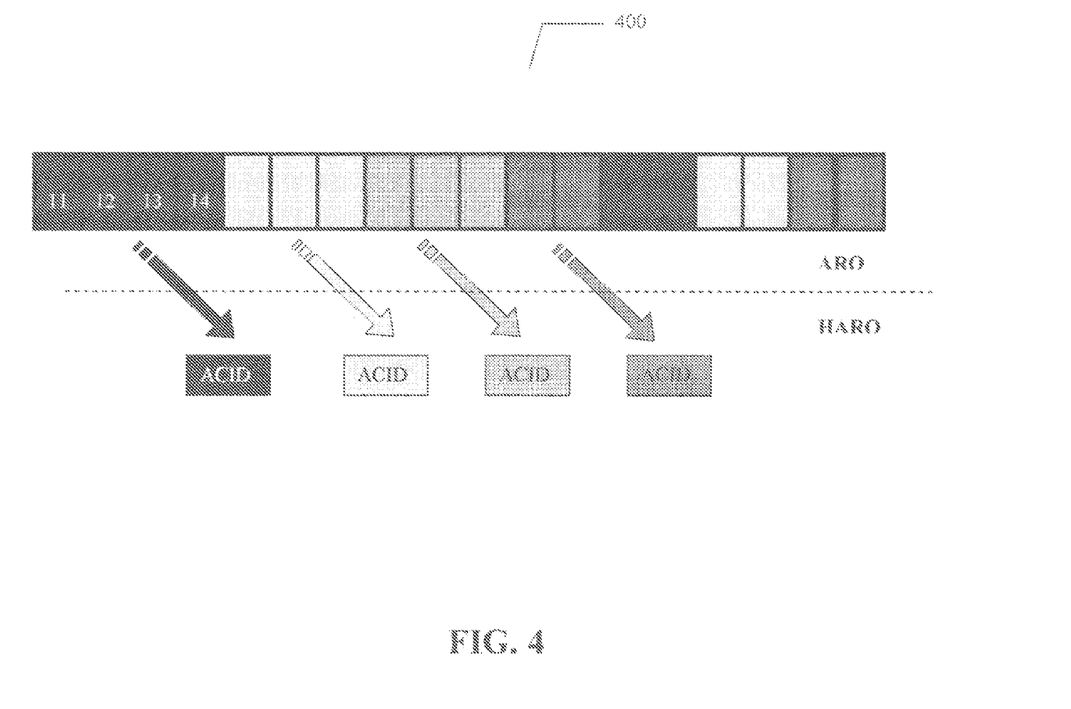
FIG. 4 illustrates the mapping between ARQ BSN and HARQ channels (ACID) in accordance with an embodiment of the present invention.

HARQ-ARQ coupling requires the system to maintain the following states. ARQ ACK and NACK carry much more information including ARQ BSN sequence number compared to the 1-bit HARQ ACK/NACK. At the sender side, to regenerate ARQ ACK/NACK from HARQ ACK/NACK, the sender must know the mapping between ARQ BSN ranges and HARQ channels. For example, as shown in FIG. 4 at 400, ARQ needs to know HARQ's channel ACID0 contains ARQ blocks in range.

HARQ feedbacks are more prone to errors compared to CRC protected ARQ feedbacks. There are two typical errors: ACK→NACK and NACK→ACK. Embodiments of the present invention may focus on NACK→ACK, as NACK→ACK leads to unreliable packet delivery and ACK→NACK only wastes resource. Typically NACK→ACK can be detected at the receiver side when a receiver receives a new packet in a HARQ channel while expecting retransmission of previous packet. On the other hand, an HARQ feedback channel should be robust such that such error is unlikely to occur.

Currently, WiMAX may use ½ slot (24 tones) to carry 1-bit HARQ feedback (UL HARQ ACK channel). It is designed to ensure high reliability but nevertheless is too conservative and wasteful of resources, particularly for MS with very good channels. Further, with HARQ and ARQ coupling, the ARQ receiver side may not be able to report any NACK→ACK unless ARQ NACK is sent. This translates to a very slow error recovery.

To remedy the aforementioned difficulties, an embodiment of the present invention may adaptively change the feedback channel according to MS's channel quality and QoS requirement. For example, an embodiment of the present invention may categorize the following three HARQ configurations:

1. Most efficient HARQ feedback channel, e.g., 1-bit ACK=¼ slot. This is suitable for those MS with good channels or tolerate to relative high loss ratio. If a MS has good channel, efficiency is achieved without significantly compromising reliability.

2. Regular HARQ feedback channel, e.g., 1-bit ACK=½ slot. This is the same as current WiMAX.

3. Reliable HARQ feedback channel, e.g., 2-bits ACK=1 slot. The 1st bit carries regular HARQ feedback information. The 2nd bit indicates whether an NACK→ACK error is detected for the previous packet.

It is understood that the above categories are listed as representing examples. One can for example also define 2-bit ACK=½ slot etc given different requirements. In addition, DL HARQ ACK channel may be embedded with AI_SN field toggle in HARQ_CONTROL_IE. One can insert an extra bit in the IE but one can not change the coding rate, i.e., only regular ACK and option 3 above are available.

To arrange a mobile station (MS) to different categories may require a scheduler to consider detected link error, channel quality and QoS. Particularly for Category 3—reliable HARQ feedback channel, scheduling may be difficult. In down-link HARQ feedback (or ACK) channel (not currently used in WiMAX), a base station (BS) may detect the NACK→ACK error and schedule accordingly. For an up-link HARQ ACK channel, the scheduler does not have knowledge about NACK→ACK error, which is detected at the MS. Therefore the BS may only rely on NACK→ACK error history (if available), current channel quality and QoS requirement to determine which HARQ category a connection should use.

Figure 5:
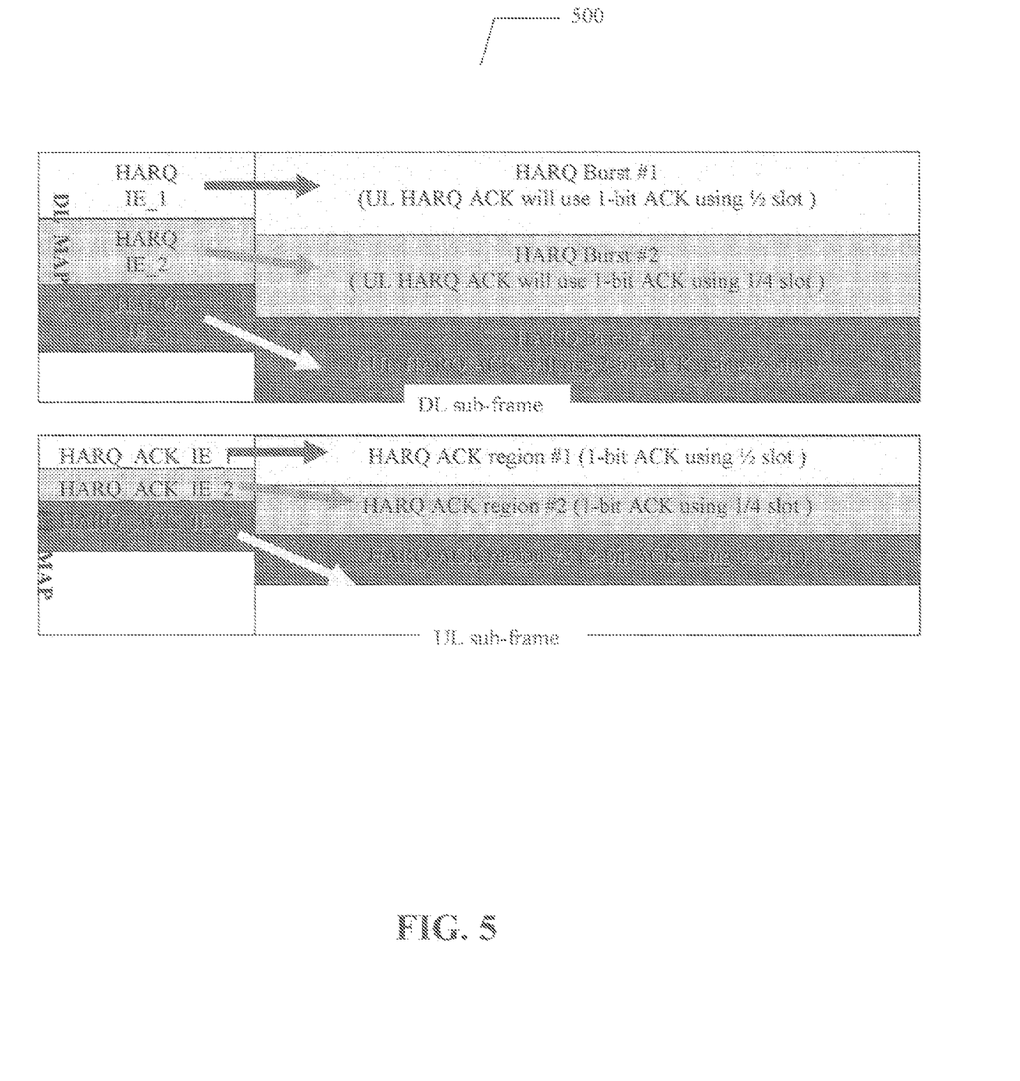
FIG. 5 illustrates how different DL HARQ bursts can be arranged along with different configurations in UL HARQ ACK in accordance with an embodiment of the present invention.

The above features may be easily implemented in the current WiMAX framework. As illustrated in FIG. 5 at 500, HARQ DL/UL MAP IEs have reserved fields that can be used to indicate which category a HARQ burst is assigned. Different DL HARQ bursts can be arranged along with different configurations in UL HARQ ACK.

Figure 6:
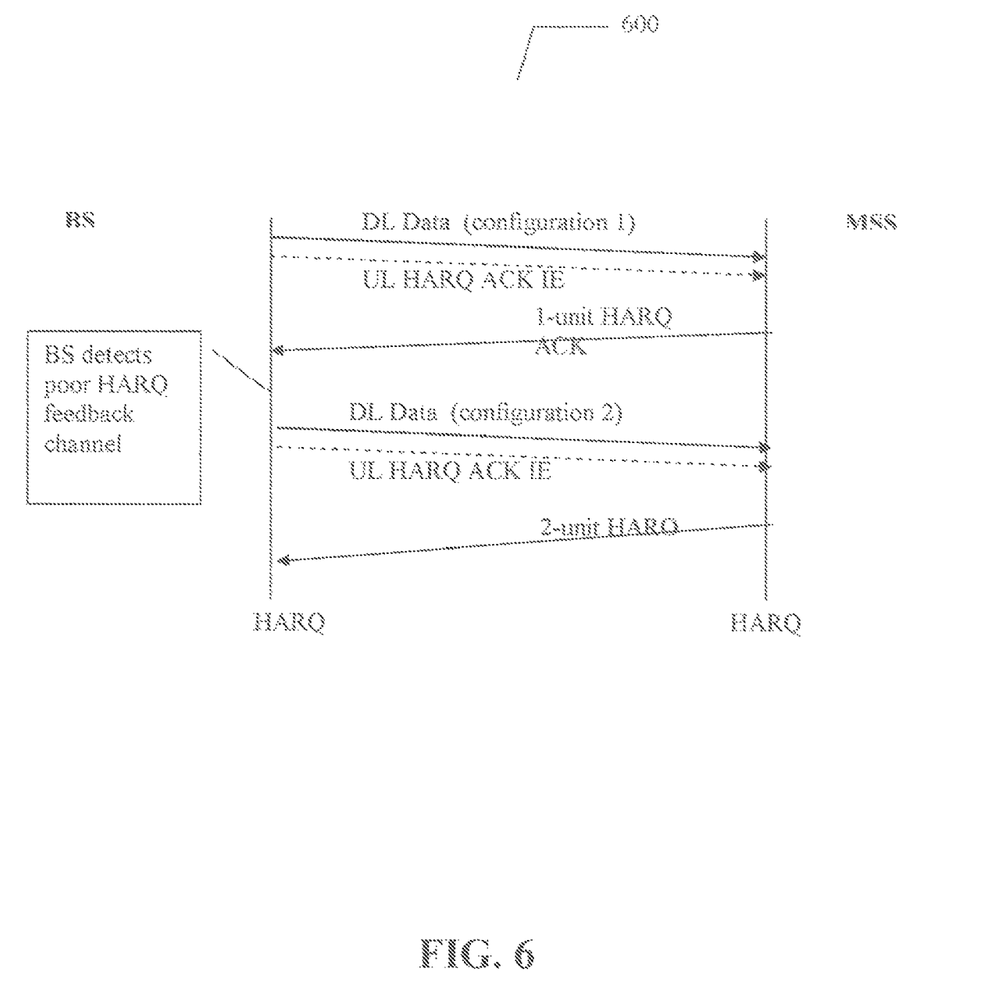
FIG. 6 illustrates the BS initiated adjusting UL HARQ feedback channel configuration, when detecting a poor HARQ ACK channel quality in accordance with an embodiment of the present invention.

Looking at FIG. 6 at 600 is an illustration of the BS initiated adjusting UL HARQ feedback channel configuration, when detecting a poor HARQ ACK channel quality in accordance with an embodiment of the present invention. FIG. 6 provides a diagram showing how to ensure HARQ ACK channel reliability by switching configurations and correct corrupted packet if enforced by QoS requirements.

In an embodiment of the present invention there may be the following two complementary options. There is no major difference between NACK→ACK and ACK→NACK as both indicate unreliable feedback channel.

Figure 7:
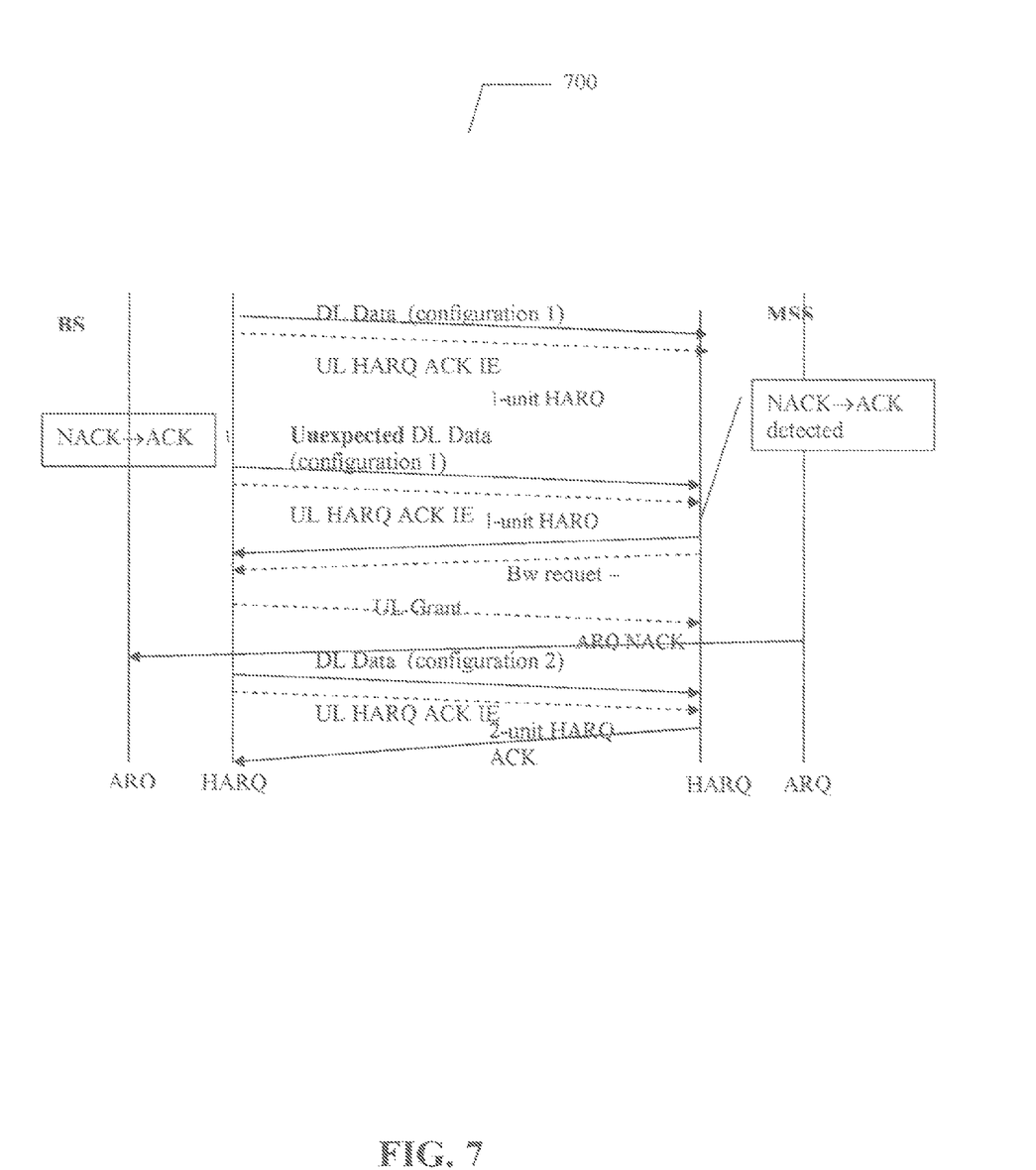
FIG. 7 illustrates the UL HARQ feedback channel reconfiguration initiated by MSS ARQ NACK in accordance with an embodiment of the present invention.

FIG. 7, shown generally at 700, illustrates the UL HARQ feedback channel reconfiguration initiated by MSS ARQ NACK in accordance with an embodiment of the present invention. When many NACK→ACK errors are detected, MSS sends ARQ NACK to notify BS and BS may choose a more reliable HARQ feedback channel configuration for subsequent transmissions. Note that QACH refers to "quick access channel," which is specially designed bandwidth request ranging channel, with specific ranging codes can inform bandwidth request value directly. Thus it may reduce request delay and overhead significantly.

Figure 8:
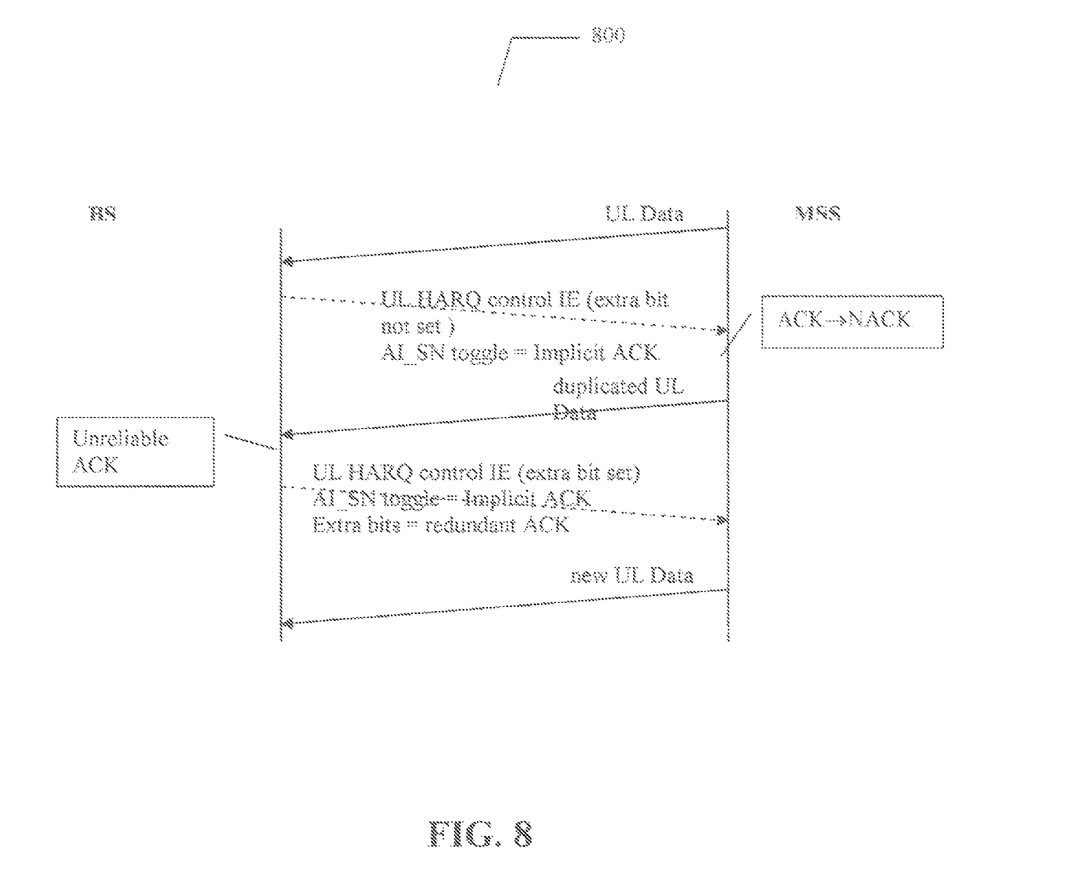
FIG. 8 illustrates DL HARQ feedback IE reconfiguration by setting the extra bit to inform any NACK→ACK and ACK→NACK errors in accordance with an embodiment of the present invention.
Figure 9:
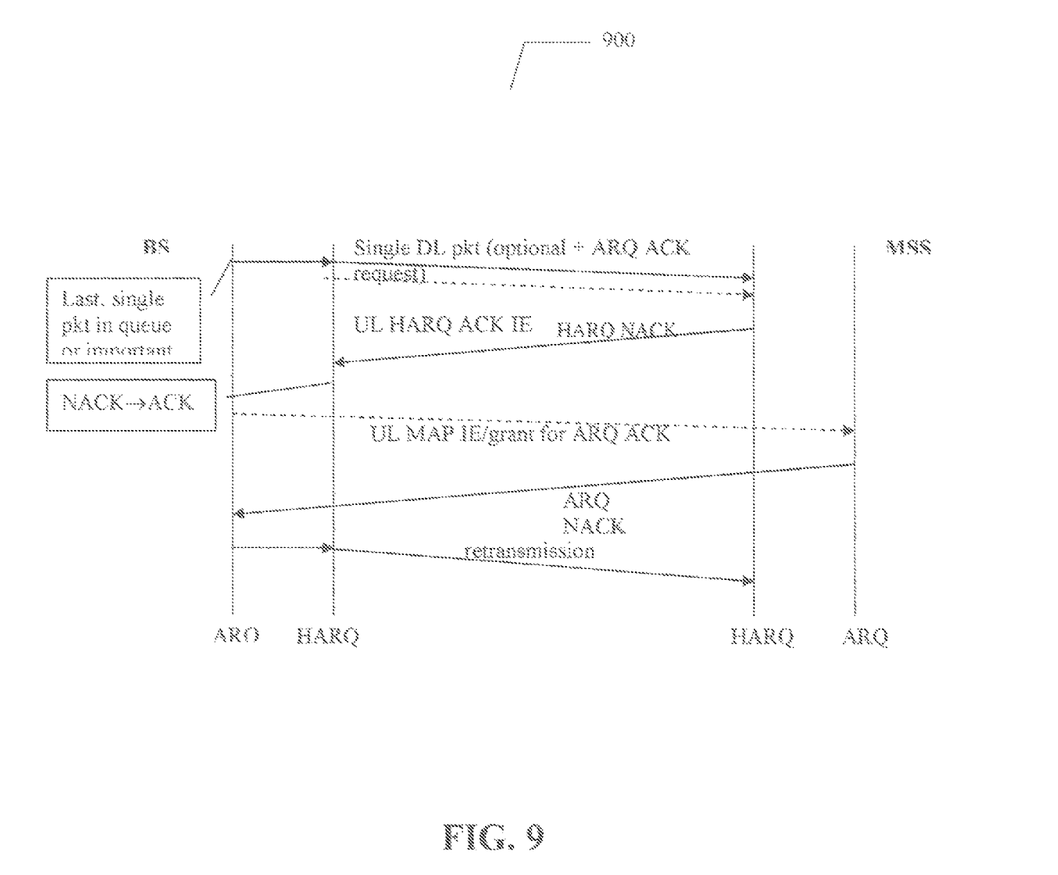
FIG. 9 illustrates reliable DL transmission of single packet by polling ARQ ACK in accordance with an embodiment of the present invention.
Figure 10:
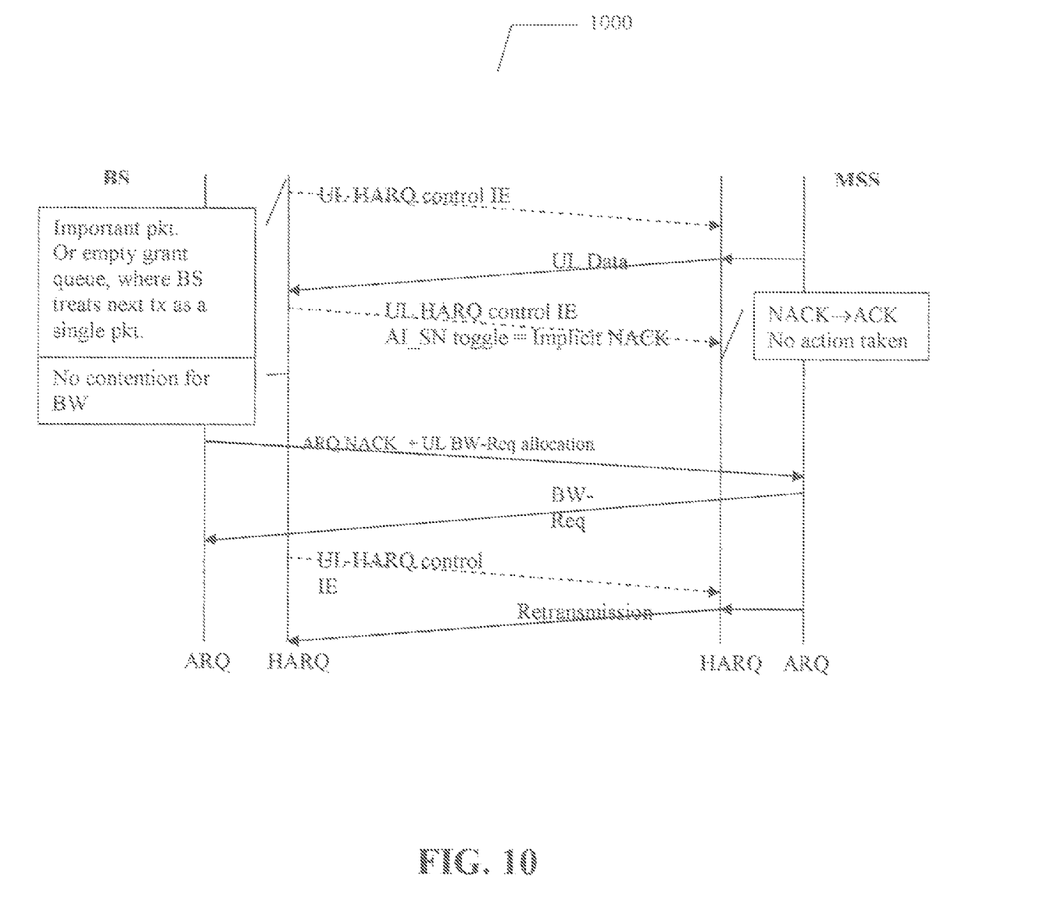
FIG. 10 illustrates reliable UL transmissions for a single packet where a base station (BS) triggers ARQ NACK and polls bandwidth request from MSS for retransmission in accordance with an embodiment of the present invention.
Figure 11:
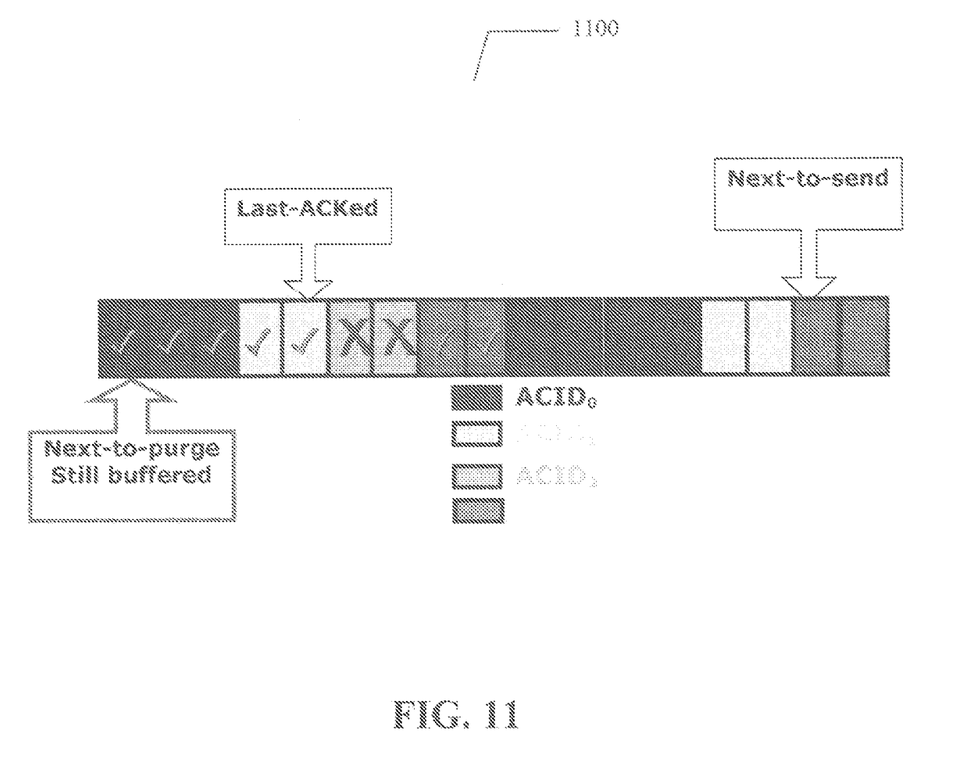
FIG. 11 illustrates ARQ buffer management in accordance with an embodiment of the present invention.

FIG. 8 illustrates DL HARQ feedback IE reconfiguration by setting the extra bit to inform any NACK→ACK and ACK→NACK errors in accordance with an embodiment of the present invention. FIG. 9 illustrates reliable DL transmission of single packet by polling ARQ ACK in accordance with an embodiment of the present invention. FIG. 10 illustrates reliable UL transmission for single packet. BS triggers ARQ NACK and polls bandwidth request from MSS for retransmission in accordance with an embodiment of the present invention. FIG. 11 illustrates ARQ buffer management in accordance with an embodiment of the present invention.

Some embodiments of the present invention may separate NACK→ACK and ACK→NACK only because data involved in the diagram are different in these two cases. Procedures are fundamentally the same. With embodiments of the present invention modifications of ARQ buffer management in HARQ-ARQ coupling may be accomplished. To efficiently support these new features, ARQ layer may require minor changes.

Although not limited in this respect, an embodiment of the present invention further may address a special scenario: single packet or the last packet of a stream. One example is TCP ACK. It is crucial to provide reliable and fast delivery of TCP ACK to enhance TCP throughput. However, a 2-bit ACK scheme does not work for single packet scenario. We lose the extra reliability from enhance HARQ layer. One option is to trigger (for DL) or poll (for UL) a simple ARQ ACK after the packet is 'successfully' delivered at HARQ layer. For a single packet that requires high reliability, ARQ ACK is simple and such overhead is justified. Here again, BS may not exactly know whether the packet MS just sends a single/last packet.

In FIG. 8 at 800 is plotted how HARQ and ARQ are combined to provide reliable delivery for a single packet. The difference from an existing system is that HARQ and ARQ operations are closely coupled.

Second, ARQ buffer management may need some modification to handle 2-bit HARQ ACK. When sending ARQ receives an internally generated ARQ ACK, it should not purge its buffer immediately as this ACK might come due to NACK→ACK error. Looking back at FIG. 6, a so-called "next-to-purge" pointer is applied to the standard sliding window, which points to the previously acknowledged but not yet purged ARQ BSN range. These conservative buffered data can be purged by some independent timer or subsequent ACKs in the same HARQ ACID channel. When a 2-bit HARQ ACK channel gives the information to correct NACK→ACK error, it may not cover all the scenarios, e.g., in the case of 1-bit UL HARQ channel before it can switch to 2-bit setting. It is therefore desired, to have ARQ NACK sent to help correct error QIUCKLY because extra buffering time leads to higher buffer/memory requirement. That is why we want to design quick access channel (QACH) to enable fast ARQ NACK transmission.

To facilitate QACH operation, it is desired to have a fixed ARQ ACK/NACK message. It is therefore necessary to design a simple format for ARQ ACK/NACK message and make ARQ BSN mapping to HARQ burst to be always consecutive for this purpose. For example, it may be the following simple format [CID/SF, NACK, BSN_start, BSN_END], although the present invention is not limited in this respect.

Current WiMAX design has independent ARQ and HARQ error-correction stacks. It is common two layers are retransmitting the same packet, or HARQ tries to retransmit some packet that has been discard by ARQ. The resource wasted on redundant retransmission and complicated/lengthy ARQ ACK messages lead to low MAC efficiency.

Coupling ARQ/HARQ operations significantly reduces the system overhead and redundancy. The coupling design also ensures fast error recovery. The designs of some embodiment of the present invention achieves these benefits without compromising the existing reliability of having two error-correction stacks, with the much lower cost of having only one layer transmission/feedback on the air-link.

Some embodiments of the present invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by a system, by a station, by a processor or by other suitable machines, cause the machine to perform a method and/or operations in accordance with embodiments of the invention. An embodiment of the present invention may provide a machine-accessible medium that provides instructions, which when accessed, cause a machine to perform operations comprising reducing ARQ overhead by coupling HARQ and ARQ feedback signaling and defining different HARQ burst regions that enable different regions to use different HARQ feedback configurations based on channel quality or QoS requirements. Further, the machine-accessible medium may further comprise further instructions, which when accessed, cause a machine to perform operations further comprising replacing actual ARQ feedback transmissions with internal feedback signaling messages generated from an HARQ layer.

Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Yet another embodiment of the present invention may provide a system, comprising a base station (BS); a mobile station (MS) operable to communicate with said base station (BS), wherein said mobile station is adapted to reduce ARQ overhead by coupling HARQ and ARQ feedback signaling and defining different HARQ burst regions that enable different regions to use different HARQ feedback configurations based on channel quality or QoS requirements While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

We claim:

1. An apparatus, comprising:
 a transceiver configured to reduce ARQ overhead by coupling HARQ and ARQ feedback signaling and defining different HARQ burst regions that enable different regions to use different HARQ feedback configurations based on channel quality or QoS requirements.

2. The apparatus of claim 1, wherein said transceiver replaces actual ARQ feedback transmissions with internal feedback signaling messages generated from an HARQ layer.

3. The apparatus of claim 1, wherein said HARQ is configured to be the most efficient HARQ feedback channel.

4. The apparatus of claim 1, wherein said HARQ is configured to be the regular HARQ feedback channel.

5. The apparatus of claim 1, wherein said HARQ is configured to be the most Reliable HARQ feedback channel.

6. A method, comprising:
 reducing ARQ overhead by coupling HARQ and ARQ feedback signaling and defining different HARQ burst regions that enable different regions to use different HARQ feedback configurations based on channel quality or QoS requirements.

7. The method of claim 6, further comprising replacing actual ARQ feedback transmissions with internal feedback signaling messages generated from an HARQ layer.

8. The method of claim 6, further comprising configuring said HARQ to be the most efficient HARQ feedback channel.

9. The method of claim 6, further comprising configuring said HARQ to be the regular HARQ feedback channel.

10. The method of claim 6, further comprising configuring said HARQ to be the most reliable HARQ feedback channel.

11. A non-transitory machine-accessible medium that provides instructions, which when accessed, cause a machine to perform operations comprising:
 reducing ARQ overhead by coupling HARQ and ARQ feedback signaling and defining different HARQ burst regions that enable different regions to use different HARQ feedback configurations based on channel quality or QoS requirements.

12. The non-transitory machine-accessible medium of claim 11, further comprising further instructions, which when accessed, cause a machine to perform operations further comprising replacing actual ARQ feedback transmissions with internal feedback signaling messages generated from an HARQ layer.

13. The non-transitory machine-accessible medium of claim 11, further comprising further instructions, which when accessed, cause a machine to perform operations further comprising configuring said HARQ to be the most efficient HARQ feedback channel.

14. The non-transitory machine-accessible medium of claim 11, further comprising further instructions, which when accessed, cause a machine to perform operations further comprising configuring said HARQ to be the regular HARQ feedback channel.

15. The non-transitory machine-accessible medium of claim 11, further comprising further instructions, which when accessed, cause a machine to perform operations further comprising configuring said HARQ to be the most reliable HARQ feedback channel.

16. A system, comprising:
 a base station (MS);

a mobile station (BS) operable to communicate with said base station (MS), wherein said mobile station is configured to reduce ARQ overhead by coupling HARQ and ARQ feedback signaling and defining different HARQ burst regions that enable different regions to use different HARQ feedback configurations based on channel quality or QoS requirements.

17. The system of claim 16, wherein said mobile station replaces actual ARQ feedback transmissions with internal feedback signaling messages generated from an HARQ layer.

18. The system of claim 16, wherein said HARQ is configured to be the most efficient HARQ feedback channel.

19. The system of claim 16, wherein said HARQ is configured to be the regular HARQ feedback channel.

20. The system of claim 16, wherein said HARQ is configured to be the most Reliable HARQ feedback channel.

\* \* \* \* \*